June 30, 1964 N. E. WOLFF 3,139,354

MAGNETIC RECORDING ELEMENT CONTAINING MAGNETIC PARTICLES TREATED WITH WERNER-TYPE COMPLEX COMPOUND AND METHOD OF MANUFACTURE THEREOF

Filed March 31, 1961

INVENTOR.
NIKOLAUS E. WOLFF
BY
W.S. Hill
AGENT

United States Patent Office 3,139,354

Patented June 30, 1964

3,139,354

MAGNETIC RECORDING ELEMENT CONTAINING MAGNETIC PARTICLES TREATED WITH WERNER-TYPE COMPLEX COMPOUND AND METHOD OF MANUFACTURE THEREOF

Nikolaus E. Wolff, Princeton, N.J., assignor to Radio Corporation of America, a corporation of Delaware Filed Mar. 31, 1961, Ser. No. 99,898

19 Claims. (Cl. 117—121)

Figure 1:
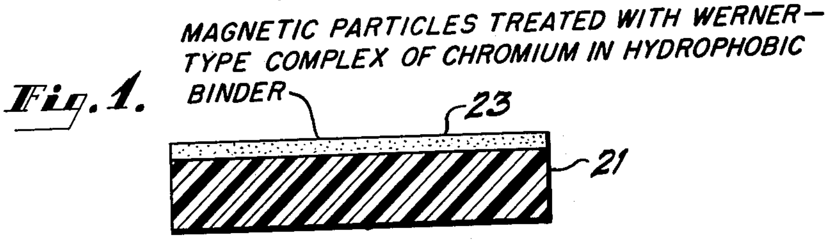

This invention relates to an improved magnetic recording element and to a method of manufacture thereof.

One type of magnetic recording element comprises a base in the form of a tape or film having thereon a coating comprising magnetic particles in an organic polymeric binder. Such recording elements are usually prepared by dispersing the magnetic particles in a solution of the binder in an organic solvent, coating the dispersion on the base, and then drying the coating by evaporating the solvent.

Most, if not all, magnetic particles which are used in magnetic recording elements are hydrophilic and organophobic; that is, they are compatible with aqueous solvent systems and are not compatible with organic solvent systems. As a result, they do not form dispersions readily in organic solvents and organic binder media, even with the assistance of dispersing agents. This fact evidences itself by a clumping of the magnetic particles in the dispersion. Even the use of less than the maximum loading (weight percent magnetic particles) in the coating does not improve the dispersion substantially. Clumped particles in the product result in non-uniform recording of information through non-uniform particle distribution and in the loss of information due to poor resolution. In addition "drop outs" occur which are caused in part by particles or clumps that are abraded from the coating during its use.

An object of this invention is to provide an improved magnetic recording element.

A further object is to provide a method for manufacturing the improved magnetic recording element of the invention.

The recording element of the invention comprises a base having thereon a coating consisting essentially of magnetic particles in a polymeric binder therefor. Each of the magnetic particles has a chemically bonded surface layer of a Werner-type complex compound of chromium cations and carboxylic acid radicals. In particular, the surface layer consists of a Werner-type complex compound of chromium cations and carboxylic acid radicals having 1 to 16 carbon atoms selected from the group consisting of aliphatic, cyclo-aliphatic, aromatic, mixed aliphatic-aromatic, and heterocyclic radicals.

As a result of employing the particular surface layer of the present invention, the magnetic particles may be more uniformly dispersed in the coating of the recording element, thereby reducing clumping. This reduced clumping markedly increases the retentivity and frequency response of the recording element. The reduced amount of non-uniformity in the recording medium also decreases sharply the proportion of drop-outs occurring during use. In addition, a higher loading of magnetic particles in the recording element can be achieved resulting in a higher output for a given coating thickness.

By providing the particular surface layer of the invention on the magnetic particles, the manufacturing process is also improved. The process of the invention comprises first treating finely divided magnetic particles to provide thereon a chemically bonded surface layer of the desired Werner-type complex compound. The treated particles are dispersed in a solution comprising a polymeric binder dissolved in a suitable solvent to produce a coating mixture. The mixture is then coated on a base and the coating is dried. The use of the Werner-type complex compound to modify chemically the surface of the magnetic material improves the dispersibility of the particles producing a coating with greater uniformity of particle distribution. The proportion of magnetic particles to other ingredients can also be increased thereby providing for a higher magnetic particle density.

Figures 2, 3:
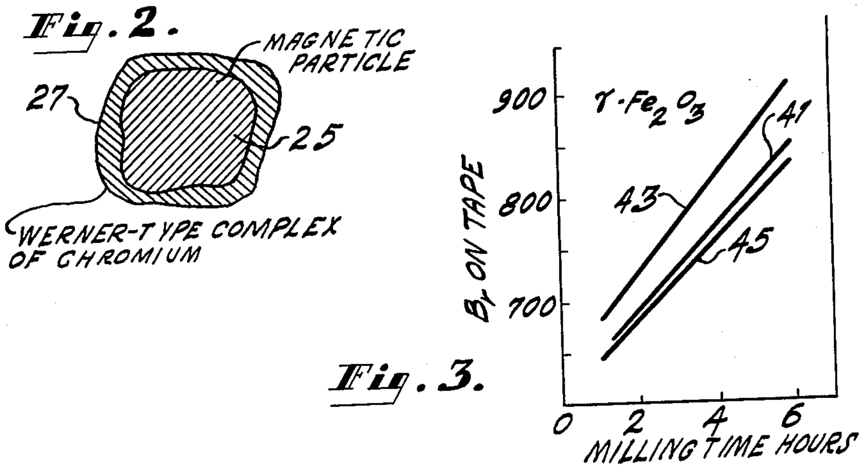

The invention is described in more detail in the following description by reference to the accompanying drawing in which:

FIGURE 1 is an enlarged sectional view of a typical recording element of the invention, FIGURE 2 is a greatly enlarged sectional view of a typical treated particle in the recording element of FIGURE 1, FIGURES 3, 4, and 5 are curves comparing the remanent magnetization $B_r$ of the completed recording elements against the time taken to disperse the magnetic particles in the binder solution, where the magnetic particles are gamma iron oxide, magnetite, and zinc ferrous ferrite particles, respectively.

A typical recording element of the invention, illustrated in FIGURE 1, comprises a base 21 having on the surface thereof a coating 23 comprising magnetic particles in a polymeric binder therefor. The magnetic particles each have a layer chemically bonded thereon of a Werner-type complex compound of chromium cations and carboxylic acid radicals. A typical particle illustrated schematically in FIGURE 2, comprises a particle 25 of magnetic material having chemically bonded thereto a layer 27 of the desired Werner-type complex compound.

Any of the usual magnetic particles may be used in the recording elements of the invention. For example, one may use metallic particles such as iron metal; or oxidic particles having a cubic crystal structure such as gamma iron oxide, magnetite, or a mixed ferrite such as zinc ferrous ferrite. The preferred materials are of the oxidic type having a cubic crystal structure. It is preferred that the particles be elongated or acicular in shape so that their bulk properties may be optimized to advantage in the product. The acicular particles are preferably between 0.2 and 2.0 microns long, 0.02 to 0.6 micron wide with an average length-to-width ratio of about 6.

The magnetic particles are preferably of the type which have oxy or hydroxy sites on their surfaces to which the chromium cations of the Werner-type complex compounds may attach chemically. Such sites are inherently available on particles of iron oxide and ferrite. Such sites are usually present on iron metal particles as soon as the particles are contacted with moist air or water.

Werner-type complex compounds have been described previously; for example, in U.S. Patents 2,273,040 and 2,559,629. However, not all Werner-type complex compounds are useful in preparing magnetic recording elements. To be effective, the cation portion of the complex compound must bond chemically to the surface of the particle and the acid radical portion of the complex compound must have an affinity for the specific binder of the magnetic coating.

It has been found that Werner-type complex compounds of chromium cations and carboxylic acid radicals satisfy the foregoing requirements. In particular, the useful Werner-type complexes are compounds of trivalent chromium cations and carboxylic acid radicals having 1 to 16 carbon atoms selected from the group consisting of aliphatic, cycloaliphatic, aromatic, mixed aliphatic-aromatic and heterocyclic radicals. The preferred complex compounds are of trivalent chromium cations and radicals of carboxylic acids having the formula X—R—COOH; wherein X is selected from the group consisting of OH, $NH_2$, SH, CN, $NO_2$, $CF_2H$, $CF_3$, H, and the halogens; and R is a radical haivng 1 to 16 carbon atoms selected from the group consisting of aliphatic, cyclo-aliphatic, aromatic, mixed aliphatic-aromatic, and heterocyclic radicals which may be saturated or unsaturated, and may be either of the straight chain or branched type.

Some examples of carboxylic acids which may be complexed with trivalent chromium cations to produce complex compounds useful in the invention are:

$NC-CH_2-COOH$
$HO-CH_2-COOH$
$H_2N-CH_2-COOH$
$HS-CH_2-COOH$
$Cl_3C-COOH$

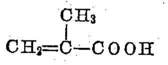

$CH_2=CH-COOH$
$CH_3-(CH=CH)_2-COOH$
Tannic acid
Oleic acid

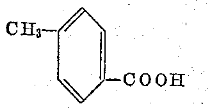

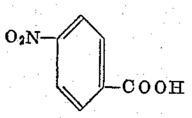

$CH_3-(CH_2)_x-COOH$
$HCF_2-(CF_2)_x-COOH$
$CF_3-(CH_2)_x-COOH$
$CF_3-(CF_2)_x-COOH$
where $x=1-16$.

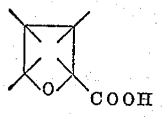

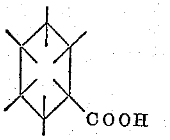

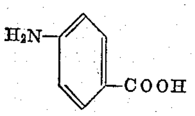

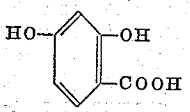

The choice of the carboxylic acid radical depends on the particular magnetic particle-binder system which is used in the coating. The optimum in desired characteristics is determined experimentally. Some commercially available Werner-type complex compounds in soluble form which may be used in the invention are Quilon and Volan, marketed by E. I. du Pont de Nemours and Company. Wilmington, Delaware. The layer 27 of a Werner-type complex compound is of molecular dimensions depending on the chain length of the carboxylic acid radical. It appears that no more than a close-packed monomolecular layer of the chrome complex is chemically bonded to the surface of the magnetic particle 25.

The layer 27 may be produced by any of the usual methods used to coat particles. The preferred method is to agitate the magnetic particles first in water. Then a solution of the Werner-type complex is added to the mixture. Then, either the pH of the mixture is increased or the temperature of the mixture is raised to cause the complex compound to react with the surface of the magnetic material. As this reaction occurs, the complex compound is believed to form a monomolecular layer on the surface of the magnetic particles. The chromium cations of the complex compound are believed to form chemical bonds with oxy- or hydroxy-sites on the magnetic particles. The chromium cations are also believed to link to one another chemically along the surface of the particle. One form of this reaction is expressed in the following chemical equations which describe the chemical action of a chromium complex of stearic acid on the surface of an iron oxide particle:

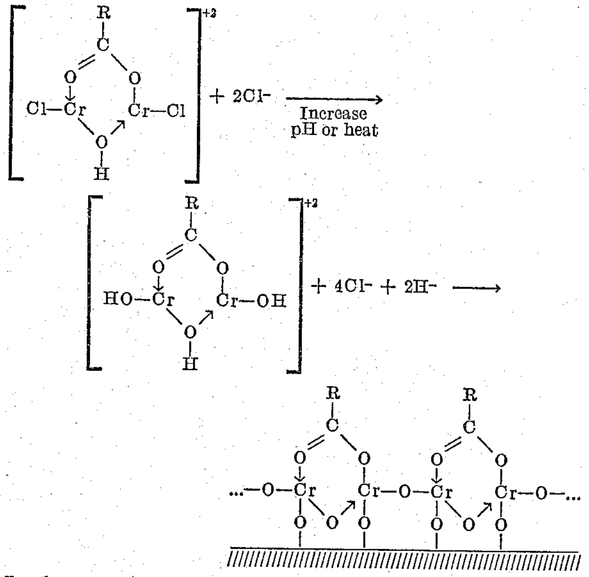

In the equation, $R=C_{17}H_{35}$, and in the end product the long line represents the surface of the magnetic particles, and the oxygens linked directly to the line are oxygen sites on the particle to which the complex compound attaches.

The action of the Werner-type complex compounds in the invention is to be distinguished from the action of dispersing agents on magnetic particles, which have been suggested previously. Dispersing agents form only a temporary layer. Their action depends on Van der Waals forces and dipolar atraction for alignment and temporary association with the surface of the particle. The layers in the invention are permanently bonded to the particle, and depend on chemical bonding to the particles and to one another for alignment and association.

After the layer is formed, the particles are removed from the solution and dried. This is preferably accomplished by diluting the mixture with water, filtering off the particles, and then drying the particles at about 90° C. in circulating warm air.

Magnetic particles treated as described above with a stearic acid chrome complex exhibit the following properties:

(1) They are not wetted by water.
(2) They are readily wetted by toluene and other organic solvents.
(3) They settle extremely slowly from dispersions in organic solvents.
(4) They exhibit a higher rate of dispersion in organic binders than untreated powders, both with and without the aid of external dispersing agents.
(5) They pack more densely both in bulk and in a coating on tape.
(6) The surface layer is permanently and chemically bonded to the particles. Powders recovered after 15 hrs. of milling in organic solvents have not changed their surface characteristics.

(7) Surface-modified ferrite particles do not appear to absorb moisture, which results in reduced magnetic moments. This latter problem is severe in uncoated powders.

The binder which is used in the coating 23 may be any of the binders used for this purpose previously. For illustrative purposes, some binder systems which may be used are vinyl chloride-vinyl acetate copolymers containing up to 25 mol percent vinyl acetate, acrylic polymers, such as copolymers of methyl methacrylate and ethyl acrylate; polyamides, acrylonitrile copolymers, polyesters, nitrocellulose, styrene-butadiene copolymers; polyurethanes, and polycarbonates. In addition, many new binders can now be used which will result in recording media of superior physical and magnetic properties. In the past, the binder had to be selected by a compromise between the physical properties required and the magnetic properties attainable. Even elaborate coating combinations with dispersing and wetting agents did not provide the desired magnetic properties. Such previous coating combination included a binder, which otherwise fulfilled the physical requirements for a specific application, such as adhesive strength of the binder to the substrate and abrasion resistance. The surface modification of the magnetic particles as described in the invention relieves this compromise. Dispersibility can be achieved with virtually any polymeric binder system, resulting in recording media of superior magnetic performance. No additional dispersing or wetting agents are necessary. In most cases, the addition of such agents has been found to produce a detrimental effect on the dispersibility in organic binder systems of the magnetic particles modified according to this invention.

Another result of the improved dispersibility of the surface-modified magnetic particles described herein is the unusually high retentivity $B_r$ attainable in the recording medium. For a given, desired retentivity $B_r$, therefore, a smaller amount of magnetic material will suffice to attain the same magnetic characteristic in the final recording medium. The increased amount of binder in this case markedly improves the physical characteristics of the recording medium. To illustrate this, a recording medium was manufactured according to the invention and required only 37 percent by volume of gamma iron oxide to provide a retentivity of 950 gauss. Another recording medium was manufacured by the same process using identical binders; but, the magnetic particles used had not been surface-modified according to the invention. Optimizing with conventional dispersing and wetting agents, it was necessary to increase the volume loading of the gamma iron oxide to 45 percent to attain the same retentivity of 950 gauss.

The base 21 functions as a support for the entire structure. The base may be in any physical form such as a drum or disc, but is preferably in the form of a flexible tape between 0.25 and 2.5 mils thick, and may be any width, usually between 0.125 and 2.00 inches wide, and may be any length up to thousands of feet long. The base may be any magnetic or nonmagnetic material. Typical base materials are paper, cellulose acetate, modified cellulose, tensilized polyvinyl chloride copolymers, polyamides and the like. A preferred base is an oriented polyethylene terephthalate film about 1.0 mil thick. This type of film is marketed by E. I. du Pont de Nemours and Co., Wilmington, Delaware, under the trademark name "Mylar."

The recording element illustrated in FIGURE 1 may be prepared using a flexible film base in a continuous process. In a typical process, a base 21 of an oriented polyethylene terephthalate film is unwound from a feed roll and passes to a coating station, then to a drying region, and is then wound on a take-up roll. The base is coated at any suitable speed. Speeds between 10 and 200 feet per minute are convenient.

At the coating station, the base 21 passes a suitable coating device, such as a doctor-blade, which has a quantity of a coating mixture behind it. The coating mixture comprises the magnetic coating formulation in a solvent for the binder. The coating mixture is applied to the base to a thickness to provide a dry coating preferably between 0.1 and 0.8 mil thick. The coating mixture may be applied by any standard coating technique, for example, dip coating, transfer roll coating or gravure roll coating. Following application, the coated base passes through a magnetic field to orient the particles therein in a desired direction. After orienting the magnetic particles, the coating is dried by evaporating the solvent therefrom. Heat may be applied to accelerate the drying. The coated base is cooled to room temperature and then wound on a take-up reel. The coated base may then be slit to any desired width. For purposes of audio recording, the width of the final product is 0.25 inch.

In order to compare recording elements prepared with and without the layer of Werner-type complex compound on the magnetic particles, the finished recording elements were used for continuous recording and play-back for several hours and the recording elements were examined physically for various forms of break down. Further, prior to such tests, the magnetic recording elements were measured for remanent magnetization ($B_r$) in a continuous B-H loop tester. Retentivity, or remanent magnetization is one of the most useful parameters for evaluating the magnetic properties of a recording element. For a given amount of magnetic material in such element, it is a criterion of dispersion and utilization of the potentially available magnetic properties for recording.

The following examples of recording elements of the invention serve to illustrate particular structures and the method of preparation thereof.

*Example 1.*—Charge a one gallon ball mill with 600 grams of acicular gamma iron oxide, such as IRN–110 grade, marketed by C. K. Williams Co., Easton, Pennsylvania, and 1700 ml. water. The mixture is milled for about 2.5 hours. The volume of the mixture is then increased to 3500 ml. by adding water thereto. To this mixture, add 48 grams of a 30 weight percent solution of stearic acid chrome complex in isopropanol. A stearic acid chrome complex solution in isopropanol is marketed by E. I. du Pont de Nemours, Inc., Wilmington, Delaware, under the trademark "Quilon–S." The mixture or slurry is then agitated for a short period and the pH is checked. The mixture should have a pH of about 4.2. The slurry is then agitated for about two hours at room temperature. Then, the agitated slurry is warmed to about 95° C. During the warming, the Werner-type chrome complex reacts with the surface of the magnetic particles to form a layer thereon. Then the slurry is diluted with an equal volume of cold water. The solids are filtered out and dried in a vacuum oven at 70° C.

The dry powder produced comprises acicular gamma iron oxide particles having bonded to the surface thereof a thin layer of a Werner-type complex compound of chromium cations and stearic acid radicals. In place of stearic acid radicals, similar results are obtained with radicals of glycine, cyanoacetic acid, para-aminobenzoic acid and para-nitrobenzoic acid. The dry powder when contacted with water is not wetted. When shaken in toluene, the dispersion settles slowly. The original, untreated gamma iron oxide is readily wetted by water and settles in lumps both in water and in toluene.

*Example 2.*—Fifteen parts by weight of the gamma iron oxide, surface-modified as described in Example 1 is ball-milled in a solution containing 7 parts of a soluble polyurethane such as Estane 5740X2, marketed by the B. F. Goodrich Chemical Company, Akron, Ohio, and 40 parts of methyl ethyl ketone. Periodic samplings of the above coating mixture are withdrawn from the ball mill and coated on a continuous web of an oriented polyethylene terephthalate base film, 1 mil thick and 4.5 inches wide. The coating speed is about 150 feet per minute. The dried coating has a thickness of about 0.5 mil.

The remanent magnetization $B_r$ of each coating is measured with a continuous B-H loop analyzer, and the resulting values of $B_r$ are plotted against milling time. The results are shown in FIGURE 3, curve 43. A similar recording element is prepared with gamma iron oxide IRN-110 which had not been surface modified with a Werner type complex compound as described in Example 1. Dispersibility is optimized by the addition of 0.2 part of lecithin and again the remanent magnetization $B_r$ of each coating is measured and plotted against milling time. The results are shown in FIGURE 3, curve 41.

*Example 3*.—A recording element is produced by dispersing 15 parts by weight of the gamma iron oxide, surface-modified as described in Example 1 in a solution containing 7 parts of a soluble polyamide resin, 20 parts ethanol and 20 parts water. The coating procedure described in Example 2 is followed and the resulting measurements of the recording element are plotted on curve 45 in FIGURE 3. Untreated gamma iron oxide particles cannot be dispersed with the aid of conventional dispersing and wetting agents in a binder solution to produce a useable coating with the polyamide resin binder described above. From a comparison of the curves 41 and 43, it is apparent that a higher retentivity $B_r$ is achieved in the final recording element and that the rate of attaining a given retentivity $B_r$ was considerably faster with the surface-coated particles. Curve 45 illustrates the usefulness of the process for a binder system where no recording element could be produced by conventional processes.

*Example 4*.—To a slurry of 400 weight parts of acicular magnetite in 300 weight parts water, add 2.4 parts of beta-resorcylic acid chromium complex and 5.6 parts of isopropanol. The pH of the slurry is adjusted to about 6.0 by adding thereto a 1 percent ammonium hydroxide solution. The slurry is agitated for about 2 hours. Following agitation, the slurry is diluted with water to three times its volume to facilitate filtration. The solids are filtered out and then dried at about 110° C. in an air-circulating oven. The powder thus produced comprises magnetite particles having chemically bonded thereon a layer of a Werner-type complex of chromium and resorcylic acid.

Figure 4:
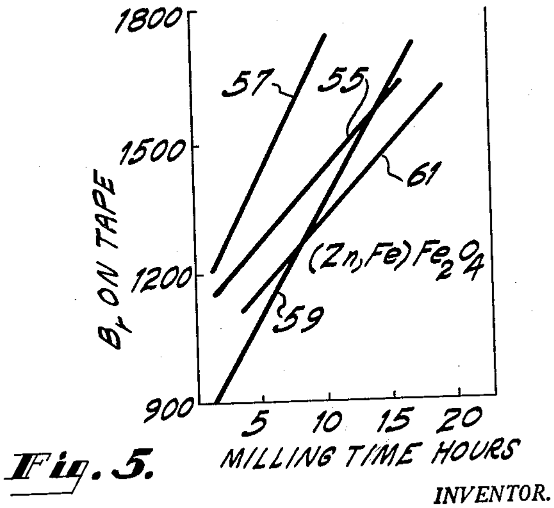

A recording element is prepared by dispersing 12 weight parts of the treated magnetite particles in a solution of 7 weight parts of a soluble polyamide resin, 20 weight parts ethanol and 20 weight parts water as described in Example 3. The remanent magnetization $B_r$ of the recording elements thus produced, is illustrated in FIGURE 4, curve 49. The remanent magnetization of a similar recording element prepared with untreated magnetite particles is illustrated by the curve 47.

*Example 5*.—To slurry of 400 parts of an acicular zinc ferrous ferrite in 300 parts of water, add 2.4 parts of trichloroacetic acid chromium complex in 5.6 parts of isopropanol. The pH of the slurry is adjusted to about 6.0 by adding a suitable portion of a one percent ammonium hydroxide solution. The slurry is agitated for 15 minutes. The slurry is then diluted with water, the solids filtered out and then dried at about 70° C. in air. The resulting material comprises zinc ferrous ferrite particles having thereon a chemically bonded layer of a Werner-type complex of trichloroacetic acid and chromium.

A coating mixture is prepared by ball-milling for various periods of time, for example 15 hours, a mixture comprising 10 weight parts of the treated zinc ferrous ferrite particles, in a solution of 3.3 weight parts of an acrylic-nitrocellulose polymeric binder dissolved in 7 weight parts toluene and 8 parts of methyl ethyl ketone.

A recording element is prepared by coating in the manner described in Example 2. The remanent magnetization of the recording element plotted against the milling time of the dispersion is shown by the curve 61 in FIGURE 5. Again it should be noted that zinc ferrous ferrite cannot be dispersed without surface modification. With conventional dispersing agents, no useful coatings for recording elements are produced in this binder system.

To illustrate the permanent chemical bond of the surface layer to the magnetic particles, a small portion of zinc ferrous ferrite which had been treated wtih a Werner-type complex compound of chromium and para aminobenzoic acid as described in Example 5 was dispersed in toluene and the rate of settling determined. A recording element was prepared with this material as described in Example 2. The coating was then washed off with organic solvents and the magnetic particles were recovered in an extractor until no more residues were found on evaporating the extracting solvent. The recovered and dried powder showed the same settling rate in toluene. A control experiment using the same zinc ferrous ferrite before surface treatment, gave settling rates in toluene which were considerably faster, and agreed within experimental error to those obtained after recovering the untreated powders from a recording element.

Examples of various magnetic particles without treatment and treated with various of the Werner-type chromium complexes and dispersed in various binder systems are enumerated in the table. Also shown in the table is the measured remanent magnetization for each recording element prepared therefrom after milling the coating mixture for 6 hours except as otherwise shown.

*Table*

Figure 5:
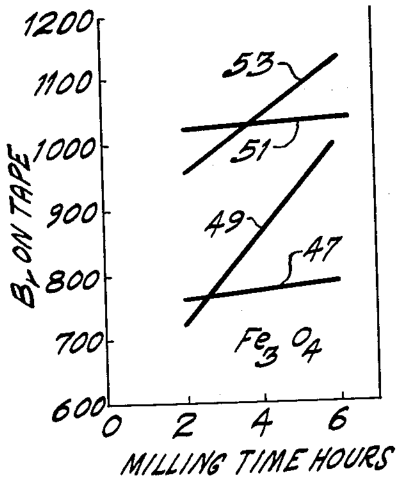

| Magnetic Particles | Chrome Complex of— | Binder | $B_r$ of the Recording Medium [1] | Curve in Figures 3, 4, and 5 |
|---|---|---|---|---|
| $\gamma$-$Fe_2O_3$ | Not treated | polyurethane | 850 | 41 |
| $\gamma$-$Fe_2O_3$ | Stearic acid | do | 910 | 43 |
| $\gamma$-$Fe_2O_3$ | Not treated | polyamide | (2) | (2) |
| $\gamma$-$Fe_2O_3$ | Stearic acid | do | 837 | 45 |
| $Fe_3O_4$ | Not treated | do | 780 | 47 |
| $Fe_3O_4$ | $\beta$-resorcylic acid. | do | 1,000 | 49 |
| $Fe_3O_4$ | Stearic acid | do | 1,025 | 51 |
| $Fe_3O_4$ | Not treated | polycarbonate | (2) | (2) |
| $Fe_3O_4$ | Stearic acid | do | 1,120 | 53 |
| $(ZnFe)Fe_2O_4$ | Not treated | acrylic-vinyl | [3] 1,650 | 55 |
| $(ZnFe)Fe_2O_4$ | Stearic acid | do | [3] 1,780 | 57 |
| $(ZnFe)Fe_2O_4$ | Methacrylic acid. | do | [3] 1,760 | 59 |
| $(ZnFe)Fe_2O_4$ | Not treated | acrylic-nitrocellulose. | (2) | (2) |
| $(ZnFe)Fe_2O_4$ | Trichloroacetic acid. | do | [3] 1,670 | 61 |

[1] All coating mixtures were milled for six hours unless noted.
[2] Not dispersible to a useable coating using conventional dispersing agents.
[3] These coating slurries were milled to attain maximum retentivity.

What is claimed is:

1. A magnetic recording element comprising a base having thereon a coating consisting essentially of magnetic particles in a hydrophobic polymeric binder therefor, the surfaces of said particles having sites from the group consisting of oxy sites and hydroxy sites, each of said magnetic particles having a surface layer chemically bonded thereto of a Werner-type complex compound of chromium cations and carboxylic acid radicals compatible with said binder.

2. A magnetic recording element comprising a base having on a surface thereof a coating consisting essentially of finely-divided magnetic particles dispersed in a hydrophobic polymeric binder therefor, the surfaces of said particles having sites from the group consisting of oxy sites and hydroxy sites, each of said particles having a chemically attached surface layer, consisting essentially of a Werner-type complex compound of chromium cations and carboxylic acid radicals compatible with said binder.

3. A magnetic recording element comprising a base having on a surface thereof a coating consisting essentially of finely-divided magnetic particles dispersed in a hydrophobic polymeric binder therefor, the surfaces of said particles having sites from the group consisting of oxy sites and hydroxy sites, each of said particles having a chemically attached surface layer consisting essentially of a Werner-type complex compound of chromium cations and carboxylic acid radicals having one to sixteen carbon atoms selected from the group consisting of aliphatic, cyclo-aliphatic, aromatic, mixed aliphatic-aromatic, and heterocyclic radicals.

4. A magnetic recording element comprising a base having thereon a coating consisting essentially of finely-divided magnetic particles of the oxidic type and having a cubic crystal structure, dispersed in a hydrophobic polymeric binder therefor, each of said particles having a surface layer chemically bonded thereto consisting essentially of a Werner-type complex compound of chromium cations and carboxylic acid radicals having one to sixteen carbon atoms selected from the group consisting of aliphatic, cyclo-aliphatic, aromatic, mixed aliphatic-aromatic, and heterocyclic radicals.

5. A magnetic recording element comprising a base having a surface coating consisting essentially of acicular magnetic particles dispersed in a hydrophobic polymeric binder therefor, said magnetic particles being of the oxidic type having a cubic crystal structure and being 0.2 to 2.0 microns in their greatest dimension, each particle having thereover a chemically-bonded surface layer consisting essentially of a Werner-type complex compound of chromium cations and radicals of a carboxylic acid having the formula X—R—COOH wherein X is selected from the group consisting of OH, $NH_2$, SH, CN, $NO_2$, $CF_2H$, $CF_3$, H and the halogens, and R is a radical having one to sixteen carbon atoms selected from the group consisting of aliphatic, cyclo-aliphatic, aromatic, mixed aliphatic-aromatic, and heterocyclic radicals.

6. A magnetic recording element comprising a base having thereon a coating consisting essentially of magnetic particles in a hydrophobic polymeric binder therefor, said magnetic particles consisting essentially of acicular gamma iron oxide particles which have been treated with a Werner-type complex compound of chromium cations and stearic acid radicals.

7. A magnetic recording element comprising a base having thereon a coating consisting essentially of magnetic particles in a hydrophobic polymeric binder therefor, said magnetic particles consisting essentially of acicular zinc ferrous ferrite particles which have been treated with a Werner-type complex compound of chromium cations and stearic acid radicals.

8. A magnetic recording element comprising a base having thereon a coating consisting essentially of magnetic particles in a hydrophobic polymeric binder therefor, said magnetic particles consisting essentially of acicular zinc ferrous ferrite particles which have been treated with a Werner-type complex compound of chromium cations and methacrylic acid radicals.

9. A magnetic recording element comprising a base having thereon a coating consisting essentially of magnetic particles in a hydrophobic polymeric binder therefor, said magnetic particles consisting essentially of acicular zinc ferrous ferrite particles which have been treated with a Werner-type complex compound of chromium cations and para-aminobenzoic acid radicals.

10. A magnetic recording element comprising a base having thereon a coating consisting essentially of magnetic particles in a hydrophobic polymeric binder therefor, said magnetic particles consisting essentially of acicular zinc ferrous ferrite particles which have been treated with a Werner-type complex compound of chromium cations and trichloroacetic acid radicals.

11. The method for preparing a magnetic recording element comprising treating finely divided magnetic particles to provide thereon a chemically bonded surface layer of a Werner-type complex compound of chromium cations and carboxylic acid radicals, the surfaces of said particles having sites from the group consisting of oxy sites and hydroxy sites, dissolving a hydrophobic polymeric binder in a solvent to produce a solution thereof, dispersing said treated particles in said solution, coating the dispersion upon a base, and then drying said coating.

12. The method for preparing a magnetic recording element comprising treating finely divided magnetic particles to provide thereon a chemically attached surface layer of a Werner-type complex compound of chromium cations and carboxylic acid radicals having 1 to 16 carbon atoms selected from the group consisting of aliphatic, cyclo-aliphatic, aromatic, mixed aliphatic aromatic, heterocyclic radicals, the surfaces of said particles having sites from the group consisting of oxy sites and hydroxy sites, dissolving a hydrophobic polymeric binder in a nonaqueous solvent to produce a solution thereof, dispersing the treated particles in said solution, coating the dispersion upon a base, and then drying the coating.

13. The method for preparing a magnetic recording element comprising contacting finely divided magnetic particles of the oxidic type and having a cubic crystal structure with an aqueous solution of a Werner-type complex compound of chromium cations and carboxylic acid radicals having 1 to 16 carbon atoms selected from the group consisting of aliphatic, cyclo-aliphatic, aromatic, mixed aliphatic aromatic, and heterocyclic radicals, removing said particles from said aqueous solution, drying said particles, dispersing said dried particles in an organic solution containing a hydrophobic polymeric binder for said particles to produce a coating mixture, coating a base with the mixture, and then drying the coating.

14. The method for preparing a magnetic recording element comprising immersing finely divided, acicular magnetic particles of the oxidic type having a cubic crystal structure in an aqueous solution containing a Werner-type complex compound of chromium cations and organic carboxylic acid radicals having the formula

X—R—COOH wherein X is selected from the group consisting of OH, $NH_2$, SH, CN, $NO_2$, $CF_2H$, $CF_3$ and the halogens, and R is a radical having one to sixteen carbon atoms selected from the group consisting of aliphatic, cycloaliphatic, aromatic, mixed aliphatic-aromatic, and heterocyclic radicals, removing said particles from said solution, then drying the particles, dispersing the dry particles in a solution of a hydrophobic polymeric binder and a solvent therefor to produce a coating mixture, coating a base with the mixture, and then drying the coating.

15. A method for preparing a magnetic recording element comprising immersing finely divided acicular gamma iron oxide particles in an aqeous solution containing a Werner-type complex compound of chromium cations and stearic acid radicals heating aqueous solution to about 95° C., agitating said solution, removing said particles from said aqueous solution, drying said particles, dispersing said dried particles in a solution containing a polyurethane binder in an organic solvent for said binder, coating a base with the dispersion, and then drying said coating.

16. A method for preparing a magnetic recording element comprising immersing finely divided acicular zinc ferrous ferrite particles in an aqueous solution containing a Werner-type complex compound of chromium cations and stearic acid radicals, adjusting the pH of said aqueous solution to about 6.0, agitating said solution, removing said particles from said aqueous solution, drying said particles, dispersing said dried particles in a solution containing a polyurethane binder in an organic solvent for said binder, coating a base with the dispersion, and then drying said coating.

17. A method for preparing a magnetic recording element comprising immersing finely divided acicular zinc ferrous ferrite particles in an aqueous solution containing a Werner-type complex compound of chromium cations and trichloroacetic acid radicals, adjusting the pH of said aqueous solution to about 6.0, agitating said solution, removing said particles from said aqueous solution, drying said particles, dispersing said dried particles in a solution containing a polyurethane binder in an organic solvent for said binder, coating a base with the dispersion, and then drying said coating.

18. A method for preparing a magnetic recording element comprising immersing finely divided acicular zinc ferrous ferrite particles in an aqueous solution containing a Werner-type complex compound of chromium cations and methacrylic acid radicals, adjusting the pH of said aqueous solution to about 6.0, agitating said solution, removing said particles from said aqueous solution, drying said particles, dispersing said dried particles in a solution containing a polyurethane binder in an organic solvent for said binder, coating a base with the dispersion, and then drying said coating.

19. A method for preparing a magnetic recording element comprising immersing finely divided acicular zinc ferrous ferrite particles in an aqueous solution containing a Werner-type complex compound of chromium cations and para-aminobenzoic acid radicals, adjusting the pH of said aqueous solution to about 6.0, agitating said solution, removing said particles from said aqueous solution, drying said particles, dispersing said dried particles in a solution containing a polyurethane binder in an organic solvent for said binder, coating a base with the dispersion, and then drying said coating.

References Cited in the file of this patent

UNITED STATES PATENTS

| | | |
|---|---|---|
| 2,273,040 | Iler | Feb. 17, 1942 |
| 2,648,614 | Martin et al. | Aug. 11, 1953 |
| 2,719,133 | Smith | Sept. 27, 1955 |
| 2,733,182 | Dalton et al. | Jan. 31, 1956 |
| 2,941,901 | Prill et al. | June 21, 1960 |
| 3,023,181 | Te Grotenhuis | Feb. 27, 1962 |

FOREIGN PATENTS

| | | |
|---|---|---|
| 717,537 | Great Britain | Oct. 27, 1954 |
| 789,613 | Great Britain | Jan. 22, 1958 |
| 860,868 | Great Britain | Feb. 15, 1961 |

OTHER REFERENCES

IBM Technical Disclosure Bulletin, vol. 2, No. 4, December 1959.